March 26, 1957 — B. B. OHNSTAD — 2,786,934
FLUX BACK-UP WHEEL FOR WELDING
Filed Jan. 16, 1956 — 4 Sheets-Sheet 1

INVENTOR
BURL B. OHNSTAD
BY
Mason & Graham
ATTORNEYS

March 26, 1957  B. B. OHNSTAD  2,786,934
FLUX BACK-UP WHEEL FOR WELDING
Filed Jan. 16, 1956  4 Sheets-Sheet 2

INVENTOR
BURL B. OHNSTAD
BY
*Mason & Graham*
ATTORNEYS

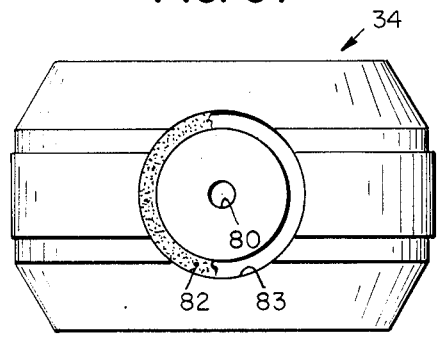
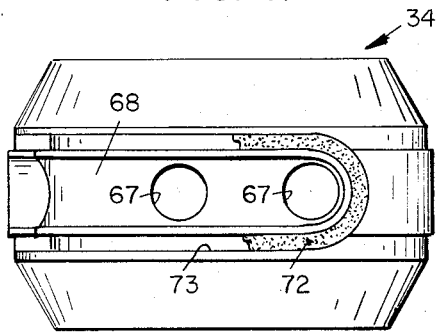
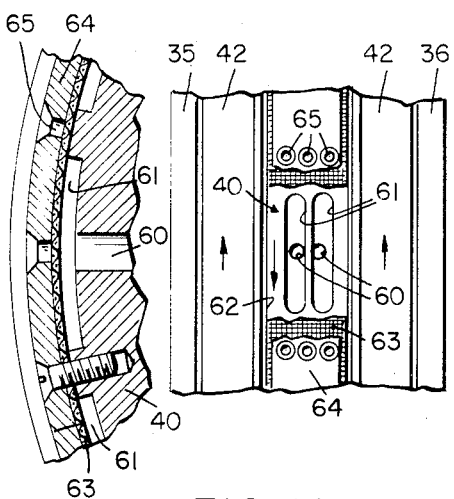
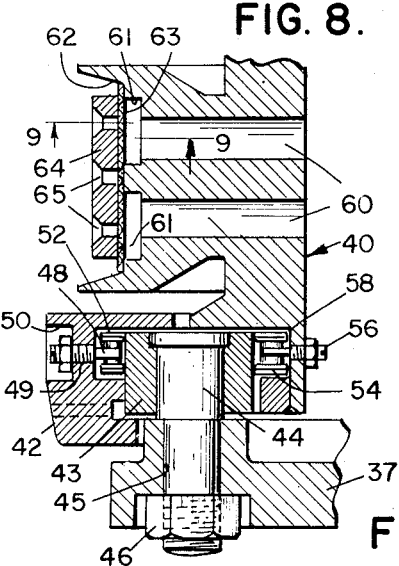
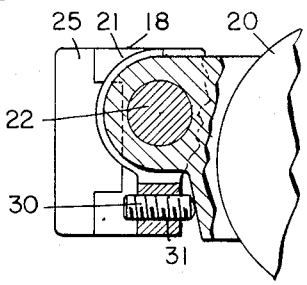
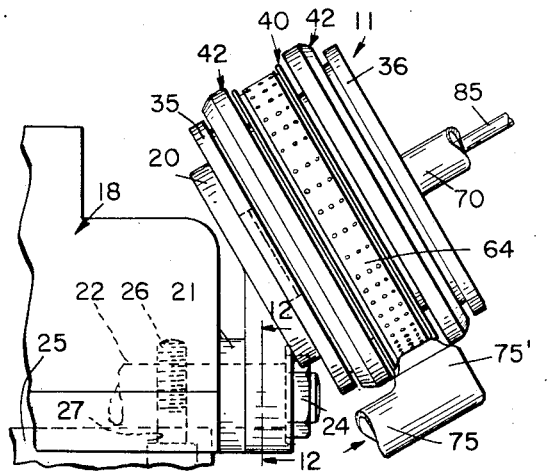

March 26, 1957     B. B. OHNSTAD     2,786,934
FLUX BACK-UP WHEEL FOR WELDING
Filed Jan. 16, 1956     4 Sheets-Sheet 4

INVENTOR
BURL B. OHNSTAD
BY
*Mason & Graham*
ATTORNEYS

United States Patent Office 2,786,934
Patented Mar. 26, 1957

2,786,934

FLUX BACK-UP WHEEL FOR WELDING

Burl B. Ohnstad, South Gate, Calif., assignor to American Pipe and Construction Co., a corporation of Delaware Application January 16, 1956, Serial No. 559,255

25 Claims. (Cl. 219—73)

This invention has to do with the provision of back-up means in the electric arc welding of strip material, particularly in the butt welding of steel strips.

In electric arc butt welding, particularly in welding together strips of material which are curved about a forming means as in the making of welded helical seam steel tubes, it is difficult to provide an efficient backing or back-up means behind the curved strips at the joint being welded.

It is therefore an object of this invention to provide new and improved apparatus for use in applying a backing of flux or other suitable divided material to the work area in the making of butt welds of sheet or strip steel and the like.

More particularly it is an object to provide a novel flux-carrying back-up wheel means which serves to provide a moving bed of flux against the under side of the work as the work is moved past the wheel.

It is a further object of the invention to provide such a flux-carrying back-up wheel in which the wheel is driven by the work as it moves past the wheel in a manner such that the back-up bed of flux is caused to move in a direction opposite to that of the work and in a path which approaches the work at the region where the welding is taking place.

A further object is to provide means in a flux back-up wheel structure whereby a bed of flux is caused to be held against the periphery of a flux-carrying wheel by vacuum action. Further in this connection, it is an object to provide a structure in which the flux-carrying wheel is of a perforate nature and wherein through a portion of its travel it is subjected to a vacuum and wherein through another portion of its travel it is subjected to a current of air under pressure for the purpose of cleaning the same.

These and other objects will be apparent from the drawings and the following description.

Referring to the drawings:

Fig. 6 is a bottom plan view of the hub or body of the device;

Fig. 7 is a top plan view of the hub or body of the device with parts broken away;

Fig. 8 is an enlarged fragmentary detailed sectional view on line 8—8 of Fig. 5;

Fig. 9 is a fragmentary sectional view on line 9—9 of Fig. 8;

Fig. 10 is a fragmentary enlarged view of the periphery of the flux-carrying wheel;

Fig. 11 is a plan view of the device of Fig. 1 and mounting means therefor;

Fig. 12 is a sectional view on line 12—12 of Fig. 11;

Figure 1:
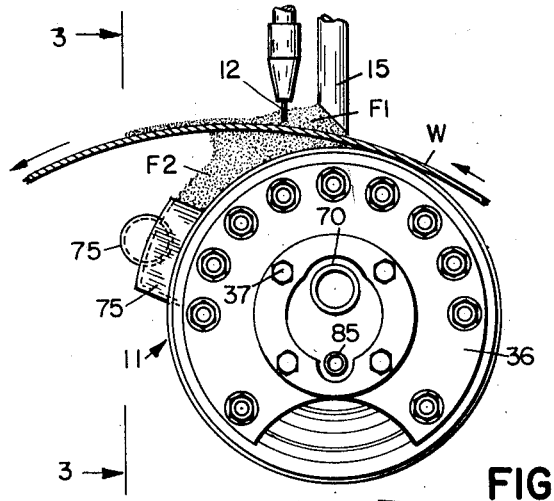
Fig. 1 is a side elevational view of a device embodying the invention shown in operative relation to the work.
Figure 3:
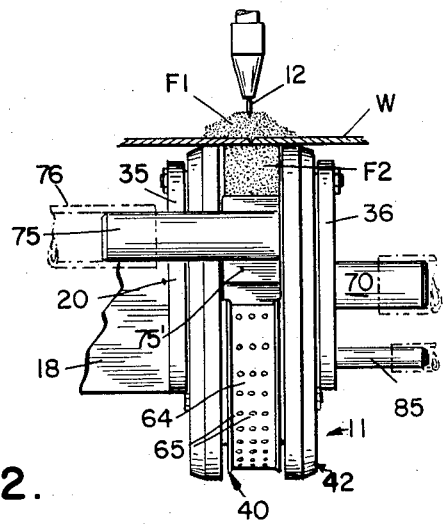
Fig. 3 is a sectional elevational view on line 3—3 of Fig. 1.

More particularly describing the invention, referring first to Figs. 1, 11 and 12, numeral 11 generally indicates what I have termed a flux back-up wheel, and this is shown associated with work W in the form of strips of sheet steel which it is assumed are being moved in a helical path in the direction of the arrows shown in Fig. 1 past wheel 11 and past a conventional arc welding rod 12. A supply of flux F1 is shown around the welding rod supplied by tube 15. Beneath the work there is another body of flux, designated F2, which is supplied and maintained against the under surface of the work by the flux back-up wheel 11.

In Fig. 11 wheel 11 is shown mounted upon a support 18 by means of a bracket 20 forming part of the wheel 11. The bracket 20 has an apertured angularly extending portion 21 which receives a stud 22 threaded at its outer end to carry a retaining nut 24. Stud 22 projects from a mounting bracket 25 which is adjustably mounted upon the support 18 by one or more screws 26 projecting through a slot 27 in the bracket 25. A set screw 30 mounted in a lug 31 on the mounting bracket serves as a means for adjusting the height of the wheel as appears in Fig. 12.

Figure 2:
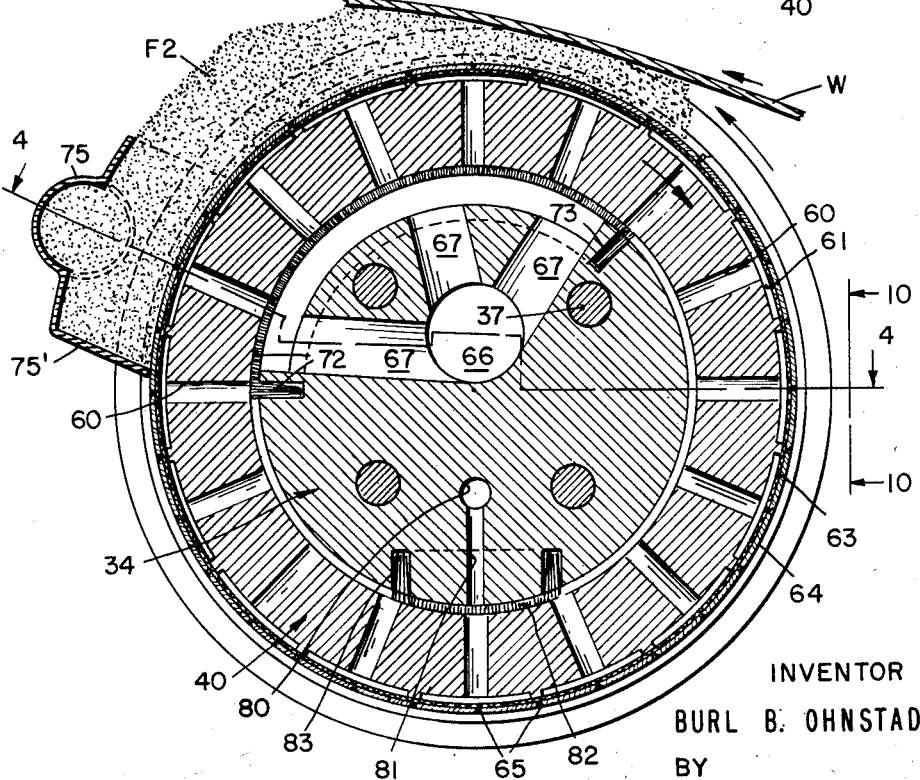
Fig. 2 is an enlarged sectional view centrally through the device of Fig. 1, the plane of the view being indicated by line 2—2 of Fig. 4.
Figure 4:
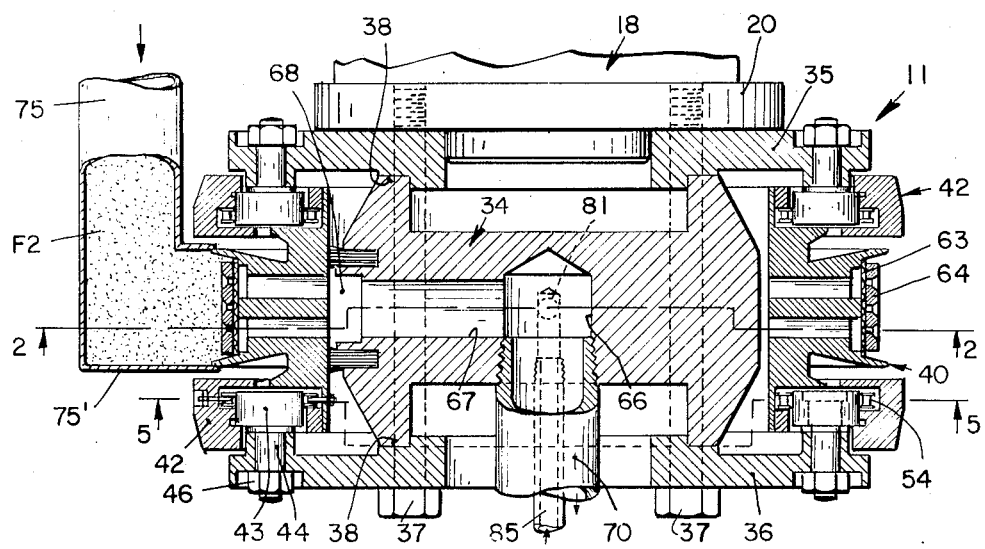
Fig. 4 is a sectional view along the planes indicated by line 4—4 of Fig. 2.
Figure 5:
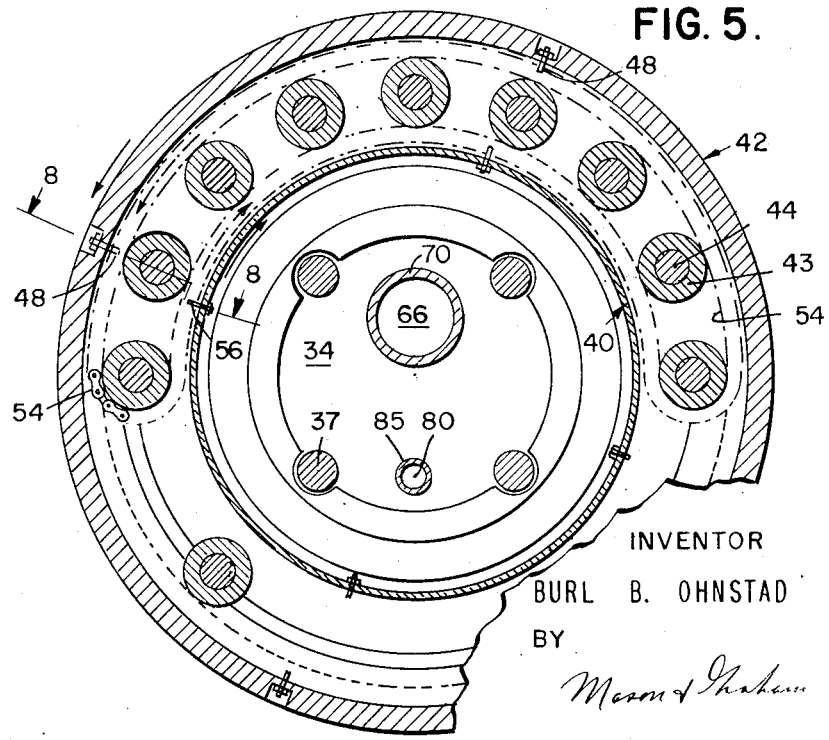
Fig. 5 is a sectional view on line 5—5 of Fig. 4.

The back-up wheel has a hub body, designated 34, to which are secured a pair of annular end plates 35 and 36 by means of screws 37 extending through the parts and threadedly mounted in the mounting bracket 20. The cross-sectional shape of the body 34 is such as to provide laterally extending annular sections or ribs 38 which partially receive the end plates. Mounted for rotation about the hub body 34 in a manner to be described is a flux-carrying wheel designated generally 40. This wheel 40 is driven in a clockwise direction as viewed in Figs. 1, 2, and 5 by means of a pair of work-engaging drive rings 42 which are carried upon rollers 43. The latter are mounted upon pins 44 received in circumferentially spaced bores 45 in the respective end plates 35 and 36, the pins being secured by nuts 46. Each of the rings 42 carries a plurality of inwardly projecting drive pins 48 in suitable bores 49 and counterbores 50, the pins being spaced circumferentially about the rings and projecting into an annular recess 52 on the inner side of the ring. The pins 48 serve to engage and drive the outer runs of a pair of roller chains 54 which are trained about several of the rollers, as best shown in Fig. 5 so that they extend approximately 180° around the wheel. The motion of the inner runs of the chains is imparted to the flux-carrying wheel 40 by means of two sets of circumferentially spaced driven pins 56 which project radially into the path of the inner runs of the chains, respectively. Pins 56 are mounted in the lateral rims of the wheel 40 which provide a chain-receiving groove 58.

It will be apparent from the construction described that when the work-engaging rings 42 are driven in one direction (counterclockwise, Fig. 1) by engagement with the moving work they will serve to rotate the flux-carrying wheel in an opposite direction or clockwise through the action of the chain and the drive and driven pins. The wheel 40 is supported for rotation by the rollers.

The flux-carrying wheel is provided with pairs of circumferentially spaced radial passages 60 which terminate at their outer ends in recesses 61 in the outer surface of the wheel. Within a groove 62 in the periphery of the wheel I provide a wire mesh or screen 63 covering recesses 61 and about this, a guard 64 in the form of a pair of semicircular metal plates having circumferentially spaced sets of holes 65. For the purpose of holding flux on and against the wheel throughout a portion of its travel, I provide means for creating a suction through the holes 65 of the plate throughout a given proportion of their travel during rotation of the wheel. This means comprises a central vacuum chamber 66 in the body 34 and several passages 67 leading therefrom to a relieved or recessed portion 68 about a portion of the periphery of the body 34. A conduit 70 is mounted in the body to communicate with chamber 66 and the conduit may lead to any conventional means for pulling air through the conduit. Thus open communication is established between the vacuum chamber and such passages 60 in the wheel as are in the region of the recess 68 as the wheel rotates.

Between the hub body 34 and the wheel, I provide a continuous brush or other type of barrier in the nature of a seal which is mounted in the hub and surrounds recess 68. The brush extends outwardly into engagement with the inner surface of the wheel, the brush or seal being indicated generally by numeral 72 and being shown mounted in a suitable groove 73.

For the purpose of supplying flux to the wheel, I provide a flux delivery tube 75 to which may be connected any suitable conduit 76 leading to a source of flux. Air under pressure may be used to move the flux through the conduit to the wheel. In the region of the wheel and directly over the same, tube 75 terminates in a housing 75' which is open on the side against the wheel and at its upper end in the direction of travel of the wheel.

It will be apparent that flux supplied to the wheel will be held thereagainst by the vacuum created at the periphery of the wheel in the region between the housing 75' and the work. Since the wheel carrying the flux is caused to rotate in a direction opposite to that of the work, the flux is carried and forced into an ever-decreasing space between the flux wheel and the work thereby insuring that the flux be tightly packed against the work to form an excellent backing or back-up for the welding operation.

For the purpose of cleaning the flux-carrying wheel and removing any fines which may have lodged in the screen or in the various suction passages, I provide an air supply passage indicated by 80 and, communicating therewith, a passage 81 which leads to the periphery of the hub at the bottom thereof. The outlet to passage 81 is surrounded by a seal or brush indicated by 82 mounted in a groove 83 in the hub. Air under pressure is supplied to passage 80 by a tube or conduit 85 from any suitable source and this serves to clean the wheel as the passages 60 therein are successively brought within the area bounded by the brush 82.

In the operation of the device, the flux back-up wheel is first mounted at a suitable location adjacent the work W and, as indicated in Fig. 1, the work is caused to move past the wheel and the welding rod in the direction of the arrows adjacent the work. The work engages the two rings 42 of the back-up wheel assembly rotating them counterclockwise as viewed in Figs. 1, 2 and 5. This movement of the rings 42 drives the flux-carrying wheel 40 in a clockwise direction throught the means comprising the chain 54 and drive pins 48 on the rings and driven pins 56 on the flux-carrying wheel. The wheel and chain are supported as are the rings 42 upon the rollers 43.

As the flux-carrying wheel rotates, flux F2 is fed to it through conduit 75 being deposited on the wheel in the region of the housing 75'. The flux is maintained in a body against the wheel by suction applied to the surface of the wheel in the region between the housing 75' and a point somewhat more than ninety degrees therebeyond through the medium of the suction chamber 66, passages 67 in the hub, passages 60 in the wheel and through the screen and openings in the guard ring thereabout. As the wheel rotates toward the work the available space for the flux decreases and the flux is packed tightly between the wheel and the work forming an excellent backup for the welding operation. Excess flux leaves the wheel as the wheel carries it beyond the work, and this may be caught in any suitable receptacle (not shown). In its rotation the flux-carrying wheel is cleaned of any flux particles which may clog the various passages including the openings in the screen of the wheel by a current of air supplied through the passages 80, 81 and passages 60 as they come within the area bounded by the brush or seal 82.

Although I have shown and described a preferred form of my invention, I contemplate that various modifications and changes may be made therein without departing from the scope of the invention as indicated by the claims which follow. For example, by way of illustration I have shown and described the work as moving past the flux back-up wheel and the welding rod; however, in some instances, it may be desirable to move the welding rod and the flux back-up wheel along the work with the latter stationary.

Figure 13:
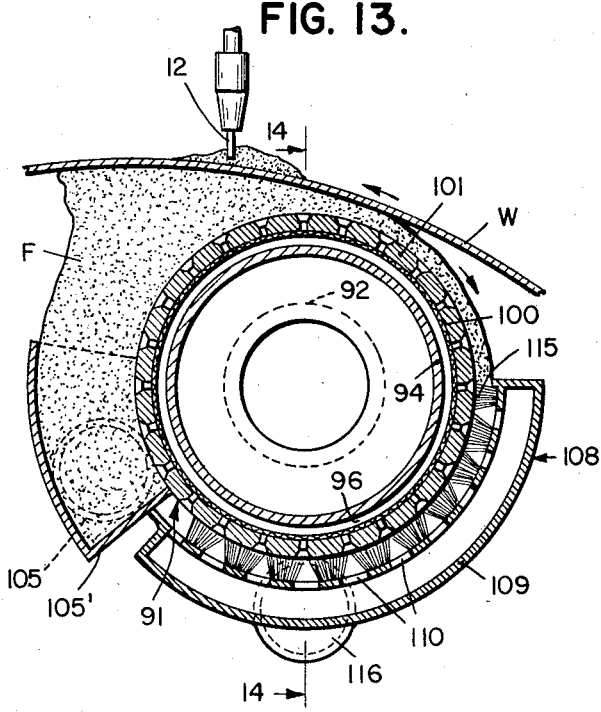
Fig. 13 is a central sectional view generally similar to Fig. 1 showing an alternate form of flux-carrying wheel structure.
Figure 14:
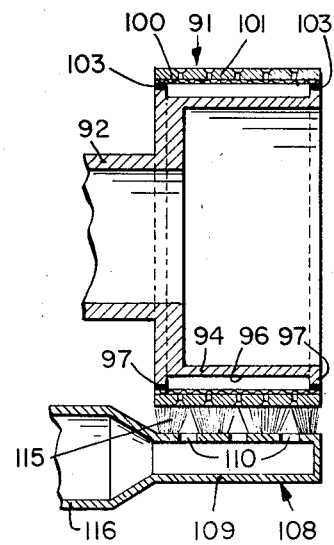
Fig. 14 is a sectional view on line 14—14 of Fig. 13.

In Figures 13 and 14 I show another form of device. Referring to these figures, a flux-carrying wheel, designated 91, is shown beneath and adjacent the work W. The wheel comprises a hollow shaft portion 92 which is adapted to be driven by any suitable motive power (not shown). It may be assumed that the portion 92 of the wheel is journaled by suitable bearing means although none has been shown. The main portion of the wheel, designated 94, is formed to provide a peripheral channel or recess 96 between marginal flanges 97 at each side of the wheel. Mounted around the wheel and over the channel 96 is a wire screen or other perforate body, indicated by 100, and about this is an apertured guard plate 101. Preferably, the screen is insulated from the body or main portion 94 of the wheel by electrical insulation, designated 103.

I provide a flux delivery conduit 105 similar to conduit 75 which terminates in a housing 105' adjacent the periphery of the flux-carrying wheel 91. Around a segment of the lower portion of the wheel I provide a vacuum head, designated generally 108, which comprises the arcuate-shaped housing 109 provided with openings 110 in its inner wall 111. The inner wall is adjacent the periphery of the flux-carrying wheel and is concentric therewith. The head carries an endless row of bristles or brush elements 115 which extends radially inward to contact and enclose or surround a given area of the periphery of the flux-carrying wheel. The head 108 has an exhaust pipe 116 which may lead to any suitable means for creating suction or vacuum therein and the head 108.

With the construction described, it will be apparent that flux delivered to the wheel by the conduit 105 is deposited thereon and held by vacuum action or suction as the channel 96 of the wheel is subjected to a partial vacuum by the head 108 serving to draw air through the portion of the wheel which is in the area bounded by the brushes 118. At the same time old flux particles are removed from and the wheel cleaned by the vacuum head 108 as the wheel passes thereby.

Figure 15:
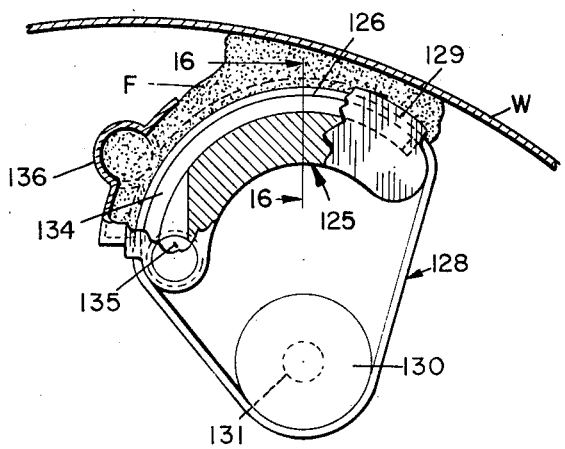
Fig. 15 is a sectional view similar to Fig. 1 showing a belt-type flux-carrying means.
Figure 16:
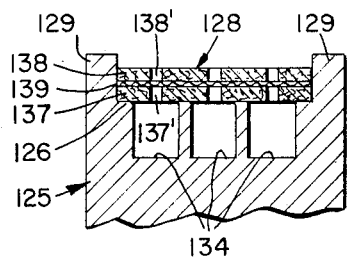
Fig. 16 is an enlarged fragmentary sectional view on line 16—16 of Fig. 15.

In Figures 15 and 16 I show another form of the invention utilizing a belt. In this form of the invention I provide a head member 125 having an arcuate belt-supporting surface 126 on which rides a flux-carrying belt, designated 128. The surface 126 is bounded by lateral flanges 129. The belt 128 passes around a driven pulley or sheave 130 on a shaft 131. The latter may be driven by any suitable means.

The surface 126 is interrupted by longitudinal grooves 134 in the head member 125 which communicate with an air exhaust passage 135. The latter may lead to any suitable air evacuation means. The grooves 134 terminate short of the ends of member 125. A flux supply conduit 136 is provided, and this may be similar to either of the supply conduits 75 or 105 previously described.

The belt 128 is of a perforate nature and preferably comprises inner and outer layers 137 and 138 of an asbestos-type fabric between which is a metal screen 139.

It will be aparent that as the belt 128 is rotated and the flux F supplied thereto by conduit 136 the flux will be held against the belt by the suction produced therethrough by means of the suction passages 134 and 135 in the head and the perforations 137′ and 138′ in the inner and outer layers respectively of the belt.

I claim:

1. In combination with work such as sheet steel or the like presenting adjacent edge portions to be welded together and electric arc welding means above said work, back-up means comprising a wheel mounted for rotation about a substantially horizontal axis with the upper portion of its periphery adjacent the under side of said work, and means utilizing suction for carrying flux on the upper portion of the periphery of the wheel.

2. In combination with work such as sheet steel or the like presenting adjacent edge portions to be welded together and electric arc welding means above said work, back-up means comprising a wheel mounted for rotation about a substantially horizontal axis with the upper portion of its periphery adjacent the under side of said work, flux carried on the upper portion of the periphery of the wheel, one of said work and said wheel being mounted for relative movement past the other, and means for rotating said wheel in a direction such that the peripheral portion of said wheel adjacent said work moves in a direction opposite to the relative direction of the work.

3. A flux back-up wheel means for use in combination with relatively moving work to be welded, comprising a stationary body, a support for said body, a wheel mounted for rotation on said body and adapted to be positioned adjacent said work, means for supplying flux to the periphery of said wheel, and drive means carried by said body adapted to be driven by engagement with said work for rotating said wheel in a manner such that the peripheral portion of said wheel adjacent the work travels oppositely to the direction of relative movement of the work.

4. Flux back-up wheel means as set forth in claim 3 in which said drive means comprises a rotatable annular member projecting radially beyond the periphery of said wheel for engagement with the work, and means for imparting movement of said annular member to said wheel.

5. Flux back-up wheel means as set forth in claim 3 in which said drive means comprises a pair of drive rings mounted concentrically of said wheel one at each side of the periphery thereof and projecting radially therebeyond, and means interposed between said drive rings and said wheel for imparting movement of said rings to said wheel.

6. Flux back-up wheel means as set forth in claim 3 in which said drive means comprises a pair of drive rings mounted concentrically of said wheel one at each side of the periphery thereof and projecting radially therebeyond, a flexible endless drive member between each drive ring and said wheel, means supporting each said endless drive member to provide an outer run thereof adjacent a circular surface of a drive ring and an inner run thereof adjacent a circular surface of said wheel, means on said drive rings for driving engagement with the outer run of an endless drive member, and means on said wheel for driven engagement with the inner runs of said endless drive members.

7. A flux back-up wheel means for use with relatively moving work to be welded, comprising a hub body adapted to be stationarily supported, two sets of rollers mounted on said hub body, the rollers of each set being spaced circumferentially about a circular path with the axes of rotation of the rollers parallel to the axis of said path, a flux-carrying wheel extending between the two sets of rollers and rotatably supported thereby, a drive ring supported on each set of rollers, a pair of chains, each said chain being trained about a plurality of the rollers of one set of rollers whereby to provide an inner run and an outer run, chain-engaging means on said rings for effecting driving engagement with the outer runs of said chains, and chain-engaging means carried by said wheel for engagement with the inner runs of said chains whereby movement of said drive rings in one direction serves to rotate said wheel in an opposite direction.

8. A flux back-up wheel means as set forth in claim 7 in which said sets of rollers are each mounted on a plate and in which said plates are detachably mounted on said hub body.

9. Wheel means comprising a hub body adapted to be stationarily supported, two axially spaced sets of rollers mounted on said hub body, the rollers of each set being spaced circumferentially about a circular path with the axes of rotation of the rollers parallel to the axis of said path, a wheel extending between the two sets of rollers and rotatably supported thereby inwardly thereof, a drive ring surrounding each set of rollers, a pair of chains, each said chain being trained about a plurality of the rollers of one set of rollers whereby to provide an inner run and an outer run, chain-engaging means on said rings for effecting driving engagement with the outer runs of said chains, and chain-engaging means carried by said wheel for engagement with the inner runs of said chains whereby movement of said drive rings in one direction serves to rotate said wheel in an opposite direction.

10. Flux back-up wheel means, comprising a support, a stationary hub body on said support, a wheel rotatable about said hub, said wheel being formed to provide a peripheral flux-carrying recess, said wheel being perforate, and means for establishing open communication through said hub body to and through the portion of said wheel opposite a given section of said hub body whereby to enable the creation of suction at the periphery of the wheel thereby to cause a body of flux to be held to said wheel throughout a portion of the revolution of the wheel.

11. Flux back-up wheel means, comprising a support, a stationary hub body on said support, a wheel rotatable about said hub, said wheel being formed to provide a peripheral flux-carrying recess, said wheel being perforate, said hub being recessed throughout a given segment of its periphery, air passage means in said hub body communicating with said recess at one end and extending to a region remote from the wheel at the other whereby to enable the creation of suction at the periphery of the wheel thereby to cause a body of flux to be held to said wheel throughout a portion of the revolution of the wheel.

12. Flux back-up wheel means, comprising a support, a stationary hub body on said support, a wheel rotatable about said hub, said wheel being formed to provide a peripheral flux-carrying recess, said wheel being perforate, air suction passage means through said hub body to a given area of the periphery of the hub body for applying suction to said given area and through the portion of the wheel adjacent the same, and air pressure passage means through said hub body to a given region of the periphery of the hub remote from said given area for applying air under pressure to and through said given region and through the portion of the wheel adjacent the same.

13. For use in combination with work to be welded, a flux back-up wheel means comprising a hub body, a wheel mounted for rotation about said body, means for rotating said wheel, said wheel having a perforate peripheral region for carrying flux, and means for applying suction to the perforate peripheral region of said wheel in a direction generally radially inward thereof whereby to provide for holding flux against its periphery.

14. For use in combination with work to be welded, a flux back-up wheel means comprising a hub body, a wheel mounted for rotation about said body, means for rotating said wheel, said wheel having a perforate peripheral region for carrying flux, means for applying suction to the perforate peripheral region of said wheel as it rotates in a given limited arc of its circular path of travel, and means for applying air under pressure outwardly through the perforate peripheral region in a given part of its path of travel remote from said given limited arc.

15. A flux back-up wheel means comprising a circular hub body, an end plate secured to said body at each side thereof, said end plates projecting beyond the periphery of said body, a set of rollers mounted on each end plate and projecting toward the other plate, the rollers on each plate being arranged in a circular path, a flux-carrying wheel surrounding said hub body and rotatably supported within and by said rollers, said wheel having air passages therethrough from its inner surface to its periphery and having a peripheral channel to receive flux, a drive ring rotatably mounted on and around each set of rollers, said drive rings projecting radially beyond said wheel for engagement with relatively moving work, means between said wheel and each of said drive rings for rotating said wheel in a direction opposite to the rotation of said drive rings, said hub body having air suction passage means leading from a given area of its periphery to the exterior at a point remote from the periphery, and a flexible barrier means carried by said hub body and engaging the inner surface of said wheel, said barrier means surrounding said given area of the periphery of said hub body whereby suction applied to said suction passage means at the point remote from the periphery of said hub body will exert a suction action at the periphery of the wheel in the region opposite said given area of the hub body as the wheel rotates for holding flux to said wheel.

16. Flux back-up means as set forth in claim 15 in which said hub body is provided with air pressure passage means leading from a second given area of the periphery thereof to a point remote therefrom and in which a flexible barrier means is provided on said body and surrounds said second given area and engages the inner surface of said wheel.

17. The method of providing a flux back-up means in welding which comprises applying flux to the periphery of a rotating, perforate circular member and exerting a suction force at the periphery of the member acting in a direction generally radially inward of the member.

18. Flux back-up means comprising a movable, perforate, flux-carrying member adapted to support a body of flux on one side, means supporting said member, and means for subjecting a portion of the other side of said member to suction whereby to exert a flux-holding action upon flux on said member.

19. Flux back-up means as set forth in claim 18 in which said flux-carrying member is endless.

20. Flux back-up means as set forth in claim 18 in which said flux-carrying member is a wheel.

21. Flux back-up means as set forth in claim 18 in which said flux-carrying member is a belt.

22. Flux back-up means comprising a wheel provided with a peripheral channel, a perforate, flux-carrying member overlying said channel, said wheel being adapted to be mounted for rotation, and suction means for applying suction to a portion of the periphery of the wheel whereby to draw air outwardly through said flux-carrying member from said channel in the region of said suction means and to induce an inward suction through the portion of the wheel beyond said suction means.

23. Flux back-up means comprising a head member providing a belt-receiving guideway, a drive pulley, a perforate belt trained around said pulley and said head member, said belt being disposed in the guideway of said head member, said head member having air passage means communicating with said guideway covered by said belt, said air passage means being adapted to be subjected to suction whereby to subject said belt in the region of the head to suction for holding flux thereon.

24. Flux back-up means for use in combination with a relatively moving work to be welded, comprising a support, a flux-carrying member providing an endless perforate surface portion for carrying flux mounted for movement on said support, a drive member carried on said support and engageable with said work to be driven thereby, drive connection means between said drive member and said flux-carrying member, and means for applying suction from the inner side of said perforate surface portion of said flux-carrying member to retain flux thereon.

25. Flux back-up means as set forth in claim 24 in which said flux-carrying member is a wheel mounted for rotation on said support.

References Cited in the file of this patent

UNITED STATES PATENTS

| | | |
|---|---|---|
| 2,294,439 | Bagley | Sept. 1, 1942 |
| 2,331,937 | Schreiner | Oct. 19, 1943 |
| 2,529,812 | Peters | Nov. 14, 1950 |